(12) United States Patent
Siliqi et al.

(10) Patent No.: US 10,310,125 B2
(45) Date of Patent: Jun. 4, 2019

(54) SYSTEM AND METHOD FOR REFINING POSITIONS OF MARINE SEISMIC RECEIVERS

(71) Applicant: CGG SERVICES SAS, Massy (FR)

(72) Inventors: Risto Siliqi, Paris (FR); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 80 days.

(21) Appl. No.: 15/440,438

(22) Filed: Feb. 23, 2017

(65) Prior Publication Data

US 2017/0254914 A1 Sep. 7, 2017

Related U.S. Application Data

(60) Provisional application No. 62/305,007, filed on Mar. 8, 2016, provisional application No. 62/303,398, filed on Mar. 4, 2016.

(51) Int. Cl.
*G01V 1/38* (2006.01)

(52) U.S. Cl.
CPC .................................. *G01V 1/3817* (2013.01)

(58) Field of Classification Search
CPC ............................ G01V 1/3817; G01V 1/3808

USPC .......................................................... 367/16
See application file for complete search history.

(56) References Cited

U.S. PATENT DOCUMENTS

| 6,932,185 B2 | 8/2005 | Bary et al. |
| 9,013,953 B2 | 4/2015 | Brizard |
| 9,417,351 B2 | 8/2016 | Brizard |

OTHER PUBLICATIONS

D. Trad et al., "Latest Views of the Sparse Radon Transform", Geophysics, Jan.-Feb. 2003, vol. 68, No. 1, pp. 386-399.

*Primary Examiner* — Daniel L Murphy
(74) *Attorney, Agent, or Firm* — Patent Portfolio Builders PLLC

(57) ABSTRACT

Seismic survey system and method for adjusting positions of plural autonomous receiver nodes (ARNs) of a seismic survey system. The method includes calculating first travel-times of direct arrivals of seismic waves, based on (i) offsets between shooting positions of seismic sources and recording positions of the plural ARNs, and (ii) a speed of the seismic waves in water; estimating second travel-times of the direct arrivals, based on seismic data recorded by the plural ARNs; estimating, in a computing device, positioning errors of one or more of the plural ARNs by applying an inversion algorithm to a misfit between the first and second travel-times; and adjusting the recording positions of the one or more ARNs with the positioning errors.

17 Claims, 15 Drawing Sheets

FIG. 8A
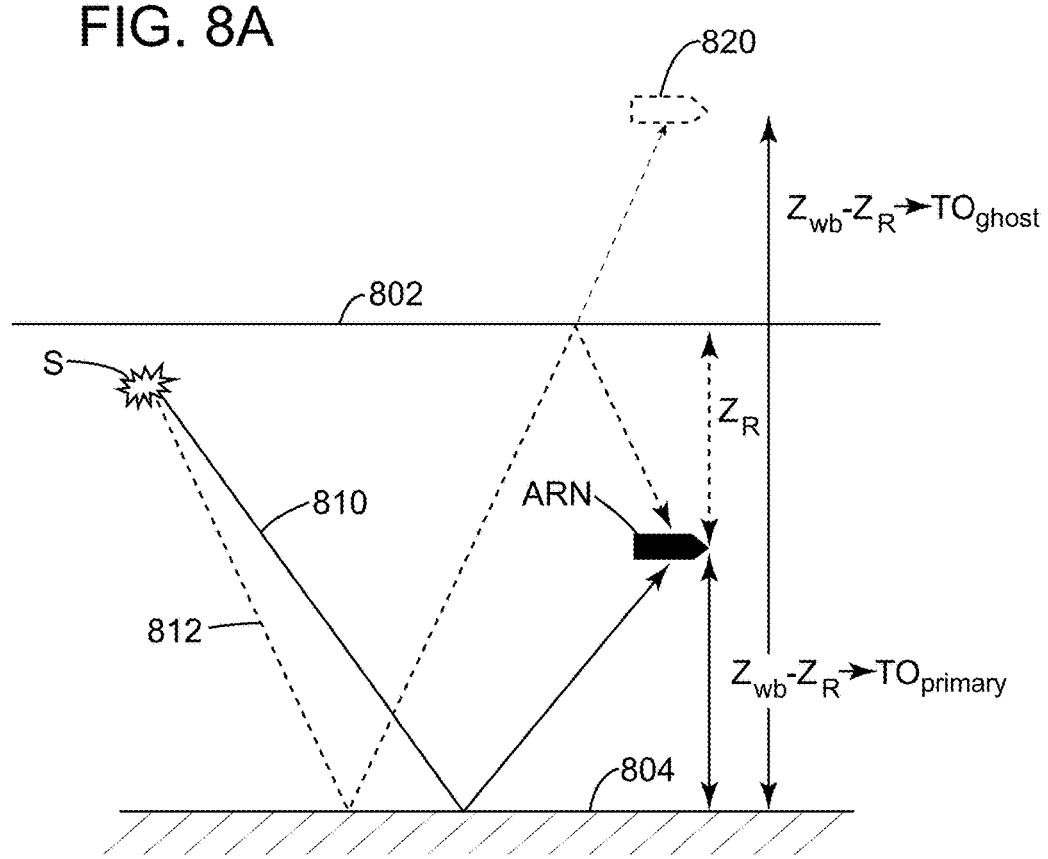
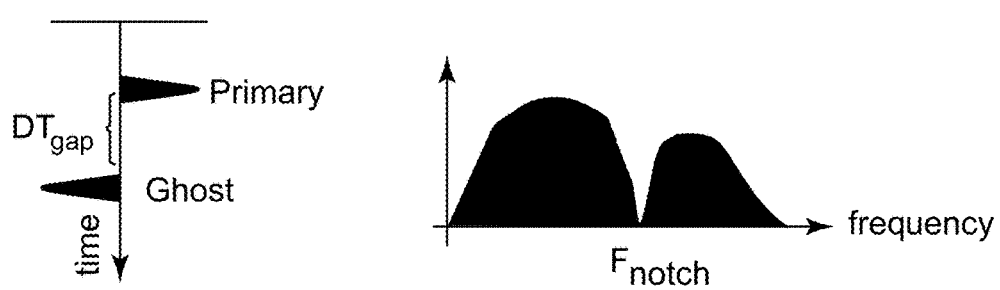
FIG. 8B             FIG. 8C

SYSTEM AND METHOD FOR REFINING POSITIONS OF MARINE SEISMIC RECEIVERS

CROSS REFERENCE TO RELATED APPLICATIONS

The present application claims the benefit of priority under 35 U.S.C. § 119(e) to U.S. Provisional Application Nos. 62/303,398 filed on Mar. 4, 2016 and 62/305,007 filed on Mar. 8, 2016. The entire contents of these documents are hereby incorporated by reference into the present application.

BACKGROUND

Technical Field

Embodiments of the subject matter disclosed herein generally relate to methods and systems and, more particularly, to mechanisms and techniques for refining positions of marine seismic receivers that move with ocean currents.

Discussion of the Background

Marine seismic data acquisition and processing generate a profile (image) of a geophysical structure under the seafloor. This image is generated based on recorded seismic data. The recorded seismic data includes pressure and/or particle motion related data associated with the propagation of a seismic wave through the earth. While this profile does not provide an accurate location of oil and gas reservoirs, it suggests, to those trained in the field, the presence or absence of these reservoirs. Thus, providing a high-resolution image of geophysical structures under the seafloor is an ongoing process. The image illustrates various layers that form the surveyed subsurface of the earth.

Reflection seismology is a method of geophysical exploration to determine the properties of earth's subsurface, which is especially helpful in determining the above-noted reservoirs. Marine reflection seismology is based on using a controlled source of energy that sends the energy (seismic waves) into the earth. By measuring the time it takes for the reflections and/or refractions to come back to plural receivers, it is possible to evaluate the depth of features causing such reflections. These features may be associated with subterranean hydrocarbon deposits.

A traditional system for generating seismic waves and recording their reflections off the geological structures present in the subsurface includes a vessel that tows an array of seismic receivers provided on streamers. The streamers may be disposed horizontally, i.e., lying at a constant depth relative to the ocean surface. The streamers may have other than horizontal spatial arrangements. The vessel also tows a seismic source array configured to generate a seismic wave. The seismic wave propagates downward and penetrates the seafloor until eventually a reflecting structure (reflector) reflects the seismic wave. The reflected seismic wave propagates upward until detected by the receiver(s) on the streamer(s). Based on the data collected by the receiver(s), an image of the subsurface is generated.

However, this traditional configuration is expensive because the cost of streamers is high. Further, due to the great length of the streamers, e.g., 10 km, the streamer array is difficult to maneuver around various obstacles, e.g., an oil platform. New technologies deploy plural seismic sensors on the bottom of the ocean (ocean bottom stations) to avoid this problem. Even so, positioning the seismic sensors remains a challenge.

Such technologies use permanent receivers set on the ocean bottom, as disclosed in U.S. Pat. No. 6,932,185, the entire content of which is incorporated herein by reference. In this case, the seismic sensors are attached to a heavy pedestal. A station that includes the sensors is launched from a vessel and arrives, due to its gravity, at a desired position and remains on the bottom of the ocean permanently. Data recorded by sensors is transferred through a cable to a mobile station. When necessary, the mobile station may be brought to the surface for data retrieval.

Although the ocean bottom nodes better handle the various obstacles present in the water, using them is still expensive and difficult because the sensors and corresponding pedestals are left on the seafloor. Further, positioning the ocean bottom nodes is not straightforward.

An improved approach to these problems is the use of plural (e.g., thousands) autonomous underwater vehicles (AUVs) for carrying the seismic sensors and collecting the seismic data. The AUVs may be launched from a deployment vessel, guided to a final destination in the ocean, instructed to record the seismic data, and then instructed to surface for retrieval. Such a system is disclosed in U.S. Pat. No. 9,417,351, which is assigned to the assignee of the present application. However, many challenges remain with the use of a large number of AUVs for collecting seismic data. One such challenge is correct positioning of the AUVs because measuring and/or predicting the positions of underwater AUVs is still challenging.

Accordingly, it would be desirable to have systems and methods that refine/improve the positions of underwater receivers participating in a seismic survey.

SUMMARY

According to one exemplary embodiment, there is a method for adjusting positions of plural ARNs (autonomous receiver nodes) of a seismic survey system. The method includes a step of calculating first travel-times of direct arrivals of seismic waves, based on (i) offsets between shooting positions of seismic sources and recording positions of the plural ARNs, and (ii) a speed of the seismic waves in water; a step of estimating second travel-times of the direct arrivals, based on seismic data recorded by the plural ARNs; a step of estimating, in a computing device, positioning errors of one or more of the plural ARNs by applying an inversion algorithm to a misfit between the first and second travel-times; and a step of adjusting the recording positions of the one or more ARNs with the positioning errors.

According to another embodiment, there is a computing device for adjusting positions of plural ARNs of a seismic survey system. The device includes an interface for receiving offsets between shooting positions of seismic sources and recording positions of the plural ARNs and a processor connected to the interface. The processor is configured to calculate first travel-times of direct arrivals of seismic waves, based on (i) the offsets between shooting positions of seismic sources and recording positions of the plural ARNs, and (ii) a speed of the seismic waves in water, estimate second travel-times of the direct arrivals, based on seismic data recorded by the plural ARNs, estimate, in a computing device, positioning errors of one or more of the plural ARNs by applying an inversion algorithm to a misfit between the first and second travel-times, and adjust the recording positions of the one or more ARNs with the positioning errors.

According to still another embodiment, there is a method for adjusting positions of plural ARNs of a seismic survey system. The method includes a step of calculating, in a computing device, future positions of the plural ARNs based on ocean currents and current positions of the plural ARNs; a step of applying, in the computing device, an inversion algorithm to the ocean currents to calculate inverted ocean currents; a step of calculating predicted positions of the plural ARNs at a given time t based on the inverted ocean currents; a step of calculating first positioning errors of the plural ARNs as a difference between the predicted positions at the given t and actual positions of the ARNs measured with an acoustic system at time t; and a step of adjusting the actual positions of the plural ARNs with the first positioning errors.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 8A to 8C illustrate one ARN, its mirror image, the primary and ghost data, and the ghost notch in the frequency domain;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having one or more seismic sensors. However, the embodiments to be discussed next are not limited to AUVs, but may be applied to other underwater platforms (e.g., glider, buoy, etc.) that may carry seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys use autonomous receiver nodes (i.e., nodes that are not connected with wires to a vessel or a controller) for collecting the seismic data associated with the surveyed underground. According to an exemplary embodiment, such a seismic system includes plural autonomous receiver nodes (ARNs), each having one or more receivers. The receivers may be one of a hydrophone, geophone, accelerometers, electromagnetic sensors, etc. If an electromagnetic sensor is used, then a source that emits electromagnetic waves may be used instead of or in addition to an acoustic source.

The ARNs may be stored on a mother vessel. The mother vessel travels to the location of the seismic survey and launches the ARNs in water. The ARNs, which may be AUVs or other devices as discussed later, move to the assigned underwater positions that are programmed into their controls. After all the ARNs are in place, they move underwater with the ocean currents and collect seismic data. The ARNs may or may not have their own propulsion system as discussed later.

A method for refining the acoustic positioning of the ARNs that move with the currents inverse the trajectory of the moving ARNs based on the instantaneous ocean current estimation and predict new positions of the ARNs. The ARNs locations provided by the acoustics, which are far away from the predicted locations are deemed to be outliers and they may be replaced by their predicted positions. This method is now discussed in more detail.

Figure 1:
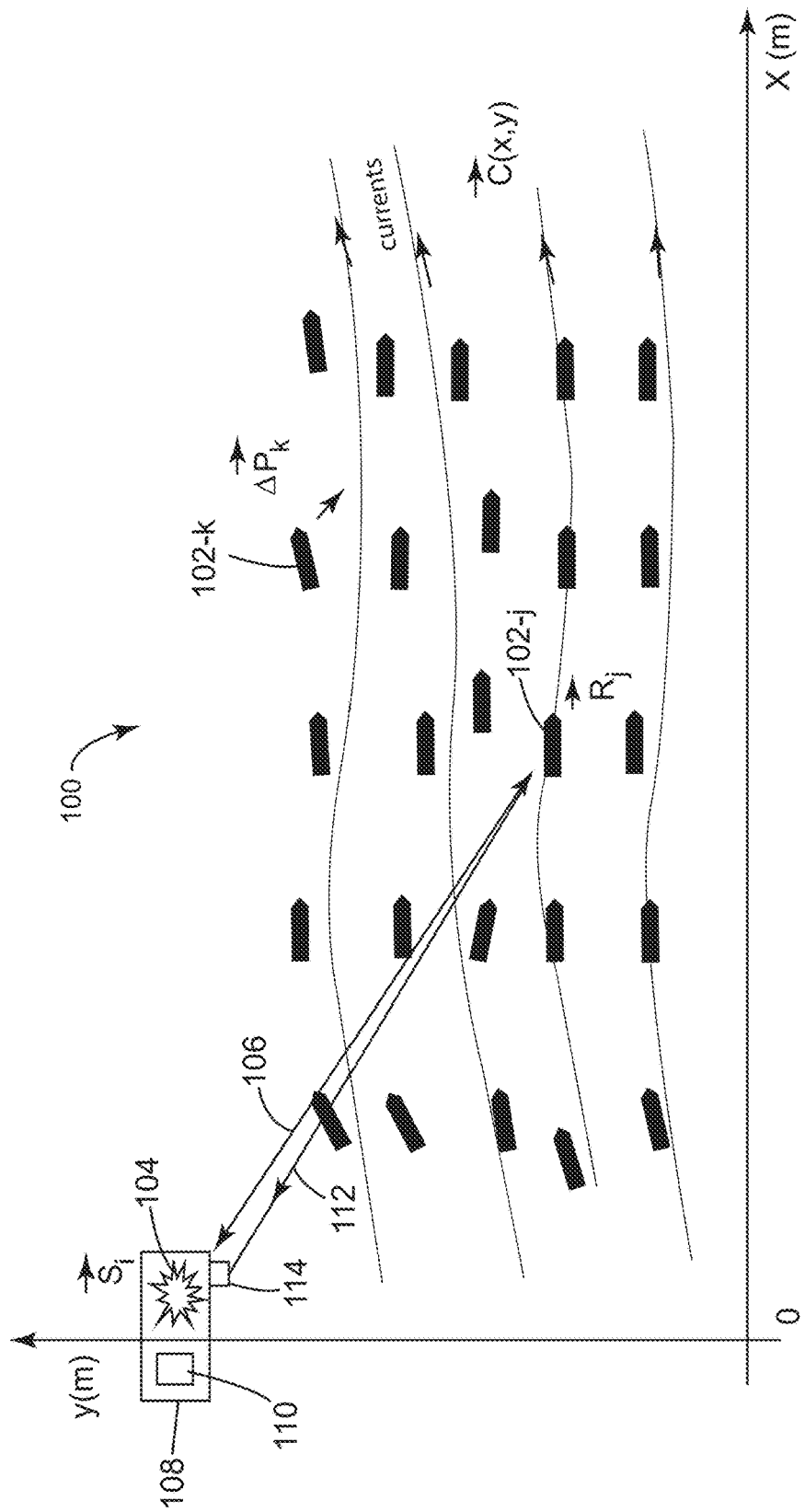
FIG. 1 is a schematic diagram of a seismic survey system that includes plural autonomous receiver nodes (ARNs) that float with the currents.

For the purpose of explaining this method, the configuration of the ARNs shown in FIG. 1 is considered. This configuration is not intended to limit the invention. FIG. 1 shows a seismic survey system 100 that includes plural ARNs 102-$j$, where "j" is an index, which is a natural number. Index j may be a number in the tens, hundreds, thousand or tens of thousands. An acoustic source 104 is also shown in the figure sending a ping (or seismic wave) 106 to the ARNs 102-$j$. For simplicity, the figure shows a single ping 106 being sent to ARN 102-$j$. The position of the ARN 102-$j$ is indicated by vector $\vec{R}_j$ and the position of source 104 is indicated by vector $\vec{S}_i$, where i is the source index. The number of sources i may be between 1 and 100, with a preferred range of 1 to 10. The positions of the sources and ARNs are indicated by vectors that originate from the reference point O.

Source 104 is configured to emit acoustic signals. For example, source 104 may be a seismic source (e.g., an air gun, a vibratory source element, etc.) that emits seismic signals having a frequency in the range of 1 Hz to 10 Khz or it may be a pinger or acoustic modem that may generate a signal having any frequency. Source 104 may be towed by or attached to a vessel 108. Vessel 108 includes a controller 110 that drives the source to generate the desired signal (e.g., the controller may include a function generator for generating a signal having a desired power and/or shape). Irrespective of the type of signal generated by source 104, a reflection 112 (from a corresponding ARN) of the signal 106 is recorded by a dedicated sensor (e.g., hydrophone) 114 and sent to controller 110 for calculating the ARN's position.

Although FIG. 1 shows a single sensor 114, vessel 108 may have two or more sensors for triangulating the location of ARN 102-$j$ and providing not only a distance to it, but also its angle relative to the axes X and Y. If only a single sensor 114 is present, then only the distance to ARN 102-$j$ may be calculated. There are many known systems for determining the position of an object underwater based on pings emitted by a vessel (see, for example, U.S. Pat. No. 9,013,953). These systems that use one or more acoustic signals for determining the position of an underwater body are referred to herein as "acoustics" or "acoustic system."

Figure 2:
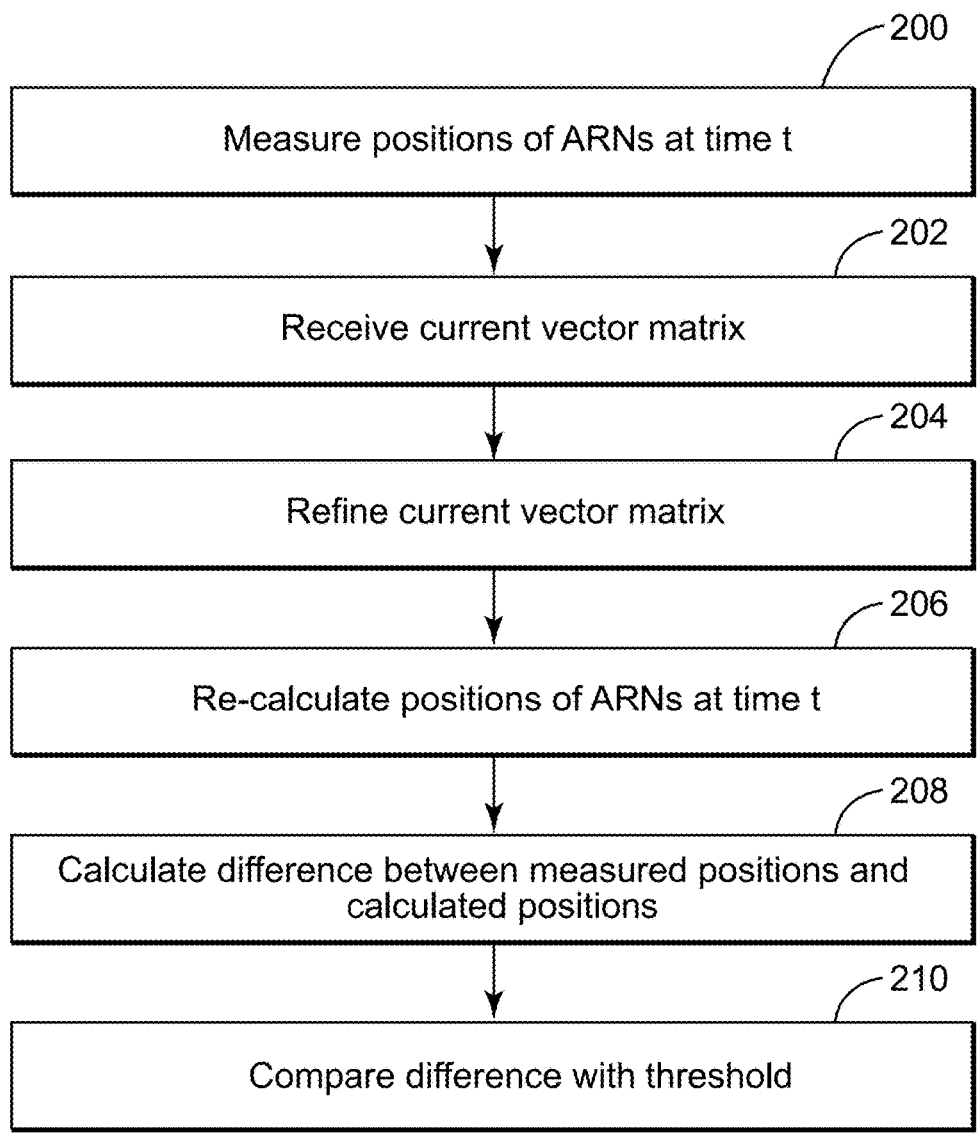
FIG. 2 is a flowchart of a method for correcting positions of the plural ARNs based on acoustic data.

Within this context, the method illustrated in FIG. 2 uses the acoustics (which may be located on a vessel floating at the water surface, on a submarine, or on a master AUV or ARN floating underwater with the other ARNs) to measure in step 200 the positions $\vec{R}_{measured}(t)$ of each ARN 102-$j$. These positions change in time, with the water currents, as illustrated by the variable "t," which represents the time. Position vector $\vec{R}_{measured}(t)$ is a 3D vector having components $(RX_i(t), RY_i(t), RZ_i(t))$, each component being measured along a corresponding Cartesian axis X, Y or Z. As previously discussed, the ARNs are grouped in a given formation (e.g., along the nodes of a grid) and maintained in those positions by a mother vessel, e.g., the vessel 108 having the source 104. The ARNs may include a propulsion system (discussed in FIG. 12) for adjusting their positions. FIG. 1 shows a single ARN 102-$k$ adjusting its position with a vector $\vec{\Delta P}_k(t)$ in the XY plane, i.e., vector $\vec{\Delta P}_k(t)$ has an X component $\Delta PX_k(t)$ and a Y component $\Delta PY_k(t)$. FIG. 1 also shows a given distribution of ocean currents $\vec{C}(x,y)$.

In step 202, the spatial distribution of the current vectors C is received (e.g., reference current vector matrix). The distribution of the current vectors C may be received from a previous seismic survey, may be measured prior to the seismic survey, may be obtained from the National Oceanic and Atmospheric Administration (or any other national or international body that calculates/traces/record the current distributions) or it may be estimated based on historic data. The spatial distribution of stationary current vectors C during a given time lapse $DT_{stationary}$ is described by:

$$C(x,y)=[Vx(x,y),Vy(x,y)]^T, \quad (1)$$

where $*^T$ means the transpose-vector. Note that this distribution of currents is stationary (i.e., it is assumed to be spatially unchanged) during the time lapse $DT_{stationary}$. A value of the time lapse $DT_{stationary}$ is in the range of tens of seconds. In one application, the time lapse $DT_{stationary}$ is about the time shooting interval (the time interval between shooting two sources or the same source during a seismic survey), e.g., about 15 s.

Knowing the ocean current distribution (reference) and current (measured) positions $R_i(t)$ of the ARNs, it is possible to refine in step 204 the current vector matrix C to better fit the measured positions of the ARN. The result of this step is a refined vector matric $C_r$. An inversion scheme may be used in step 204 to calculate the refined vector matrix $C_r$, e.g., by inverting for the current vectors C, in a least square sense, knowing the paths of the ARNs from $R(t_1)$ to $R_{calc}(t_2)$ at any dt time interval inside time interval $DT_{stationary}$. This means that the refined spatial current distribution $C_r$ may be calculated based on the least square inversion (other methods may be used as would be appreciated by those skilled in the art). In step 206, future positions of the ARNs are calculated, at a time t+dt, which is assumed to be within the time lapse $DT_{stationary}$. The future position of the "$j^{th}$" ARN is described by $\Delta R_1$, which is the displacement in the XY plane having components $\Delta R_x$ and $\Delta R_y$. The displacement $\Delta R$ relates the current position $R(t_1)$ of the ARN to its future position $R_{calc}(t_2)$ by:

$$R_{calc}(t_2)=R(t_1)+\Delta R. \quad (2)$$

The displacement $\Delta R$ for a given ARN may be calculated based on the refined current distribution $C_r$ and a time interval dt:

$$\Delta R=C_r dt \quad (3)$$

The measured and observed positions of the ARNs at a given time t may be used as follows:

$$R_{measured}(t)-R_{calc}(t) \cong 0 \quad (4)$$

for any time t between $t_1$ and $t_2$ every dt, with $R_{calc}$ being calculated using equation (2) and $R_{measured}$ being measured with the acoustic system.

In one application, prior to performing the inversion, the ARN's positions R(t) may be corrected for the active propulsions (for each receiver) if there were any, according to equation:

$$R_{update}(t)=R(t)\Delta P(t), \quad (5)$$

where $R_{update}$ is the corrected position due to active propulsion.

The refined stationary vector current $C_r$ is then used in step 206 to recalculate the location of the moving ARN at any time t as follows:

$$R_{predicted}(t+dt)=R(t)+\Delta R, \quad (6)$$

where $\Delta R$ has been calculated based on equation (3) with C replaced by $C_r$.

Figure 3:
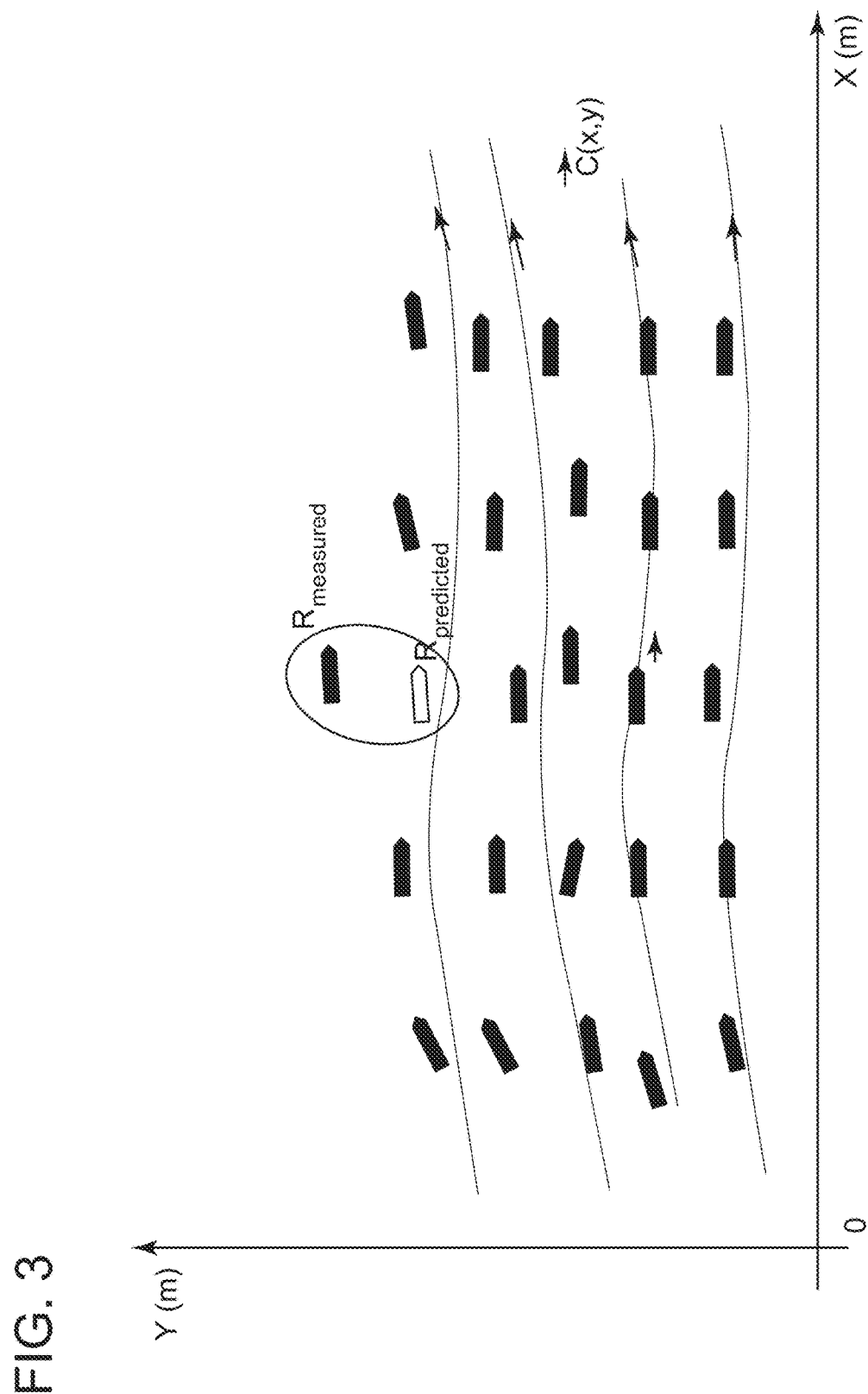
FIG. 3 illustrates the measured and predicted positions of one ARN of the plurality of ARNs.

To detect the outliers generated by the acoustics, in step 208, a difference $\Delta R_{error}$ is calculated between the measured positions $R_{measured}$ at time t, from step 200, and the calculated positions $R_{predicted}$ at time t, from step 206. The two positions are illustrated in FIG. 3. The difference $\Delta R_{error}$ (positioning errors) is compared in step 210 to a given threshold $\Delta R_{threshold}$ and those ARNs having the difference larger than the threshold are highlighted as possible outliers (erroneous positions). Note that the predicted positions may be corrected if active propulsion is present, according to equation:

$$R_{predicted_{updated}}(t)=R_{predicted}(t)\Delta P(t). \quad (7)$$

The threshold value depends on the acoustic system's positioning errors, i.e., if the errors associated with the acoustic positioning system are in the order of meters, the threshold value is in the same order.

A mask M(t) of outliers may be generated in this step and applied to the position map of the ARNs. The mask may have different weights for each ARN, the weight reflecting the confidence in the measured position of the ARN. For example, a weight of 1 or close to it shows confidence in the measured position while a weight of 0 or close to it shows an outlier. The mask, after being calculated as discussed above, may be updated from time to time. In one application, the outliers' measured positions are replaced with the predicted positions based on the calculated mask. In another application, the outliers' recorded seismic data is simply not included in the seismic data to be processed. In still another application, the seismic data of the outliers is associated with the predicted positions and processed as such. The steps of the method discussed with regard to FIG. 2 may be performed in a controller that is located on a mother vessel, submarine, a master ARN or distributed between two or more of these elements.

Figure 4:
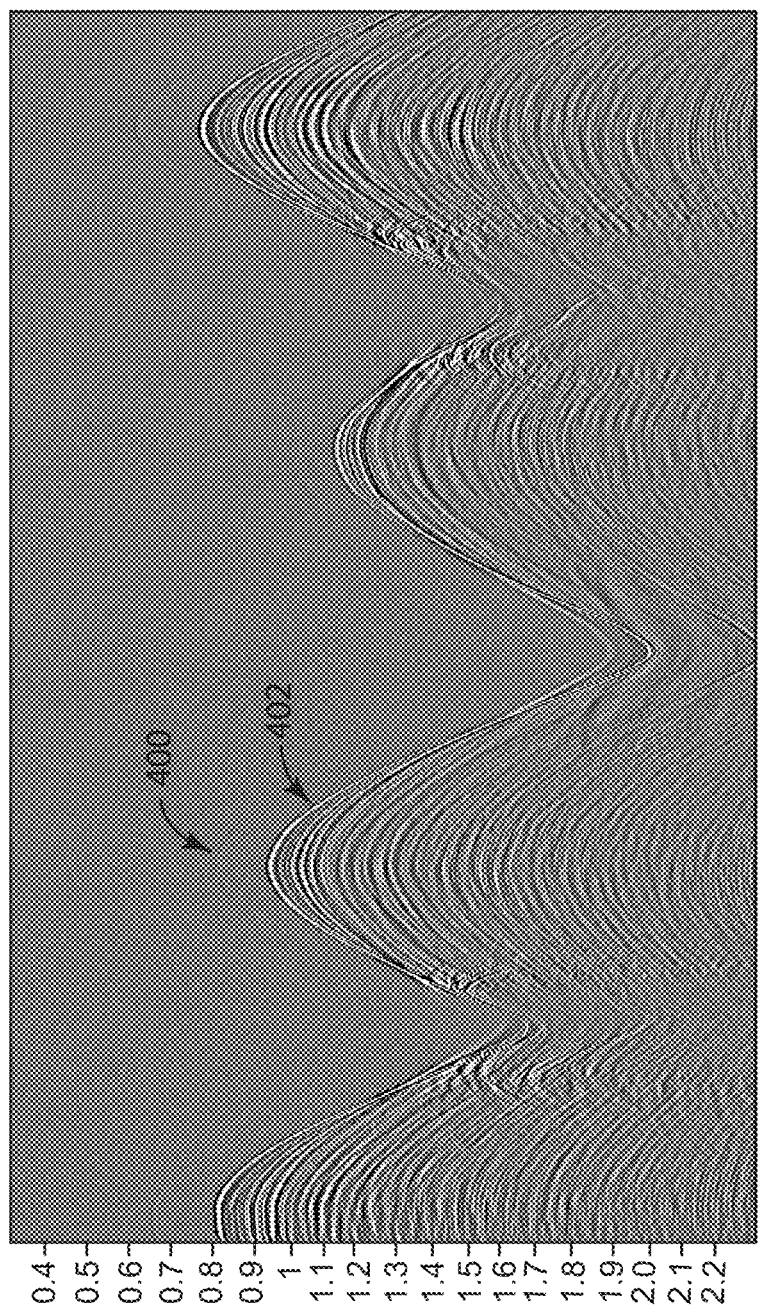
FIG. 4 illustrates seismic data collected by the ARNs.

The embodiments discussed above did not use seismic data. In this regard, the waves generated by the acoustic system for measuring the location of an ARN in the above embodiments are not considered seismic waves as these waves do not contain information about the subsurface of the earth. Seismic data is illustrated in FIG. 4 and includes a first arrival 400 and reflected and/or refracted waves 402. However, the embodiment discussed with regard to FIG. 1 may use acoustics and/or seismic data. The following embodiments are discussed assuming that the source is a seismic source and the ARN includes at least a seismic sensor.

In the following, a method for refining the positions of the ARNs by using seismic data is discussed. This method may be applied after the method of FIG. 2 has been used, or by itself, independent of the method of FIG. 2.

The method starts with receiving seismic data in step 500. The seismic data (usually defined as waves carrying information about pressure and/or particle motion of the earth due to the propagation of a seismic wave through the earth and having a frequency between 1 to 200 Hz) are generated by activating a seismic source at various shooting points "i" (i.e., spatial locations) according to a given sequence, which may be described as:

$$S_i = [SX_i, SY_i, SZ_i]^T. \quad (8)$$

The seismic data $D_j(S_i, t_i)$ generated by such source $S_i$ is recorded by the seismic sensor (located on the ARN) $R_j$ at position "j" and the position of the seismic sensor is given by:

$$R_{ji} = [RX_{ji}, RY_{ji}, RZ_{ji}]^T \quad (9)$$

where $t_i$ is the time when source $S_i$ is actuated. FIG. 4 illustrates the seismic data $D_j$ recorded by a moving AUV for sequential actuations of a moving source, the seismic data including a first arrival 400 (i.e., a seismic wave that propagates directly from the source to the receiver without being reflected by the ground) and reflected and/or refracted waves 402. This embodiment will use the direct arrival for refining the positions of the ARN.

The method receives in step 502 the positions of the sources and the positions of the ARNs. To calculate the travel-time (from the source to the receiver) for the direct arrival, the offsets between the source and the receivers are introduced. An offset $H_{ij}$ in this application is considered to be a distance in 3D, between the location of the source $S_i$ and the location of the receiver $R_j$ at a given time t, and the offset vector is defined by:

$$H_{ij} = [HX_{ij}, HY_{ij}, HZ_{ij}]^T \quad (10)$$

with the X, Y and Z components given by:

$$HX_{ij} = SX_i - RX_j$$

$$HY_{ij} = SY_i - RY_j$$

$$HZ_{ij} = SZ_i - RZ_j.$$

The magnitude of the offset vector is calculated in step 504 as:

$$H_{ij} = \sqrt{HX_{ij}^2 + HY_{ij}^2 + HZ_{ij}^2} \quad (11)$$

The travel-time of the direct arrival from source $S_i$ to receiver $R_j$ is calculated in step 506, based on the offsets $H_{ij}$ as:

$$Tcal_{ij} = H_{ij}/V_{water} \quad (12)$$

where $V_{water}$ is the speed of the sound in water. According to this method, the travel-time for the direct arrival may be calculated according to equation (12) in step 506, and the travel-time may also be estimated in step 508 from the recorded seismic data $D_j(S_i, t_i)$. There are various known methods for calculating/extracting the travel-time $Tobs_{ij}$ from the seismic data, as the first break picking or cross-correlation with the source signal. Any of the known methods may be used in step 508.

A misfit $DT_{ij}$ between the travel-time $Tcal_{ij}$ and the travel-time $Tobs_{ij}$ is calculated in step 510 as $$DT_{ij} = Tobs_{ij} - Tcal_{ij}. \quad (13)$$

The offset errors are estimated in step 512 in various ways. For example, the calculated travel-time misfit $DT_{ij}$ may be transformed into seismic offset errors $DH_{ij}$ as follows:

$$DT_{ij} = \frac{|DH_{ij}|}{V_{water}}. \quad (14)$$

Considering that the ARN locations are subject to errors, especially for the outliners that were detected with the method of FIG. 2 (if that method was applied first), then a positioning error DR associated with the position of a given receiver Rj is given by:

$$DR_{ij} = [DRX_{ji}, DRY_{ij}, DRZ_{ij}]^T. \quad (15)$$

The possible error associated with the location of the source is neglected, and thus, the offset error $DH_{ij}$ is related to the positioning error $DR_{ij}$ by:

$$DR_{ij} = DH_{ij} \text{ with}$$

$$|DR_{ij}| = \frac{DT_{ij}}{V_{water}}, \quad (16)$$

where |.| is the norm of a vector (e.g., its magnitude). This approach uses a local estimation at each receiver location through the direct calculation from the travel-time misfit.

Another approach is to apply a non-linear scheme to the travel-time calculated based on the acoustics and the travel-time calculated based on the seismic data, so that the first arrival misfits $DT_{ij}$ are minimized and the positioning errors $DR_{ij}$ are estimated. In one application, this scheme may be mathematically formulated as:

$$Tobs_{ij} - Tcal_{ij}(R_{ij} + DR_{ij}) \approx 0, \quad (17)$$

where $Tcal_{ij}(R_{ij} + DR_{ij})$ is the direct arrival travel-times calculated for the updated receiver location $Rupdate_{ij} = R_{ij} + DR_{ij}$. This approach implies a global inversion that is applied to a group of source receivers travel-time misfits. Those skilled in the art would understand that other methods for estimating the offset-errors may be used within the scope of the invention.

The inversion scheme(s) applied in this step could operate on each receiver record separately (one receiver—several sources) or jointly, on several receiver records (several receivers—several sources) assuming that the receivers remain stationary during the actuation of those sources. If a joint inversion is performed, it allows the necessary redundancy to decouple the components of $DR_{ij}$. The redundancy of equations helps with the attenuation of the possible errors associated with the measurements of direct arrival traveltimes from the seismic data. A mask of weights, similar to the one calculated in the embodiment of FIG. 2, could also be part of the joint inversion scheme.

The offset errors estimated in step 512 are considered in step 514 to represent the receiver positioning errors. In step 516, the calculated positioning errors $DR_{ij}$ are compared to a given threshold (e.g., an acceptable positioning error of the acoustic system, which may be about 2 m), and if the errors are larger than the threshold, then the measured ARN locations are replaced by the updated ARN locations Rupdate$_{ij}$ and the updated ARN locations are used to calculate the direct arrivals. Also, the updated ARN locations may be associated with the recorded seismic data and these positions may be used during the processing of the seismic data to generate an image of the surveyed subsurface.

Figure 5:
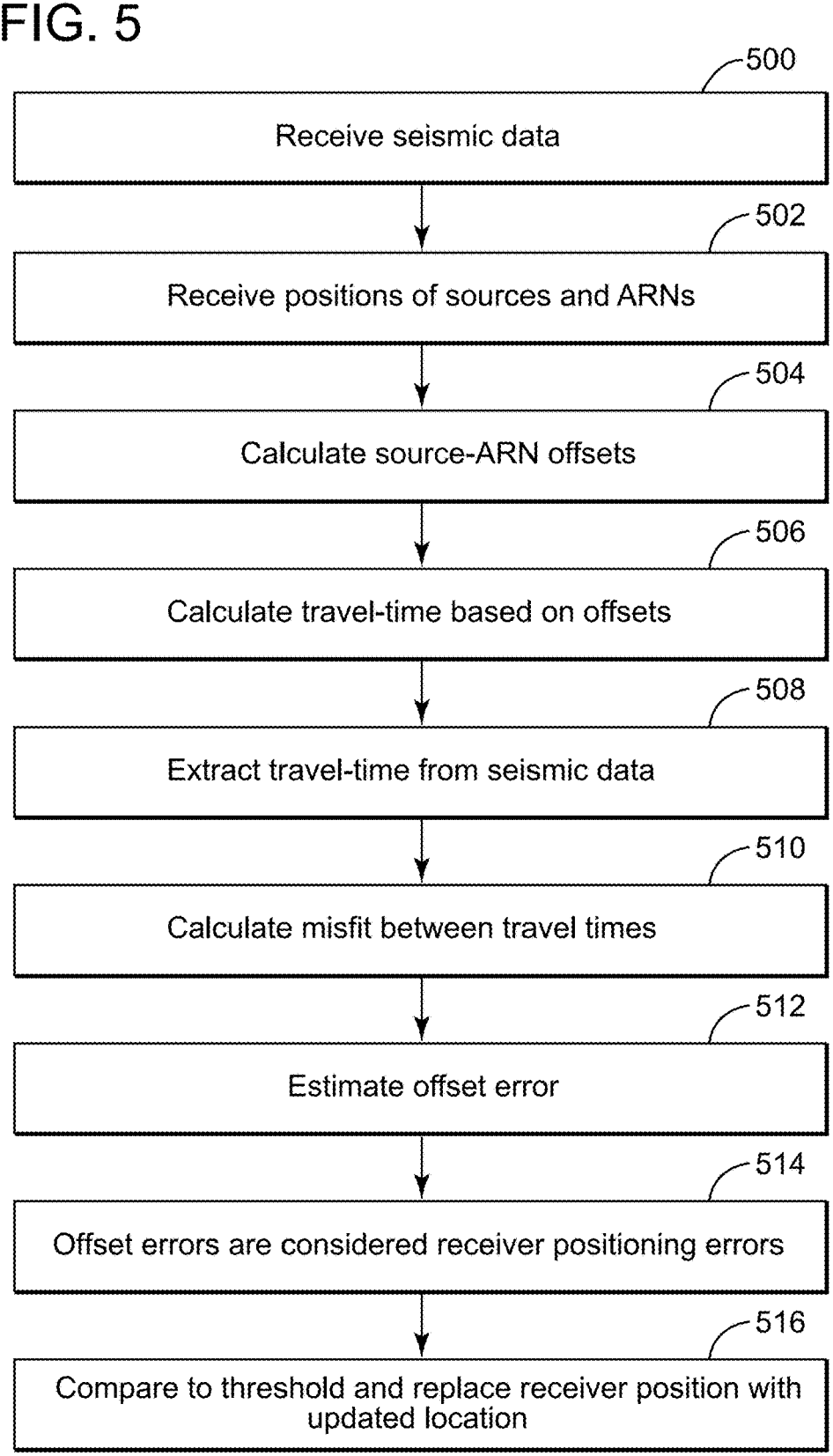
FIG. 5 is a flowchart of a method for correcting positions of plural ARNs based on seismic data.
Figure 6:
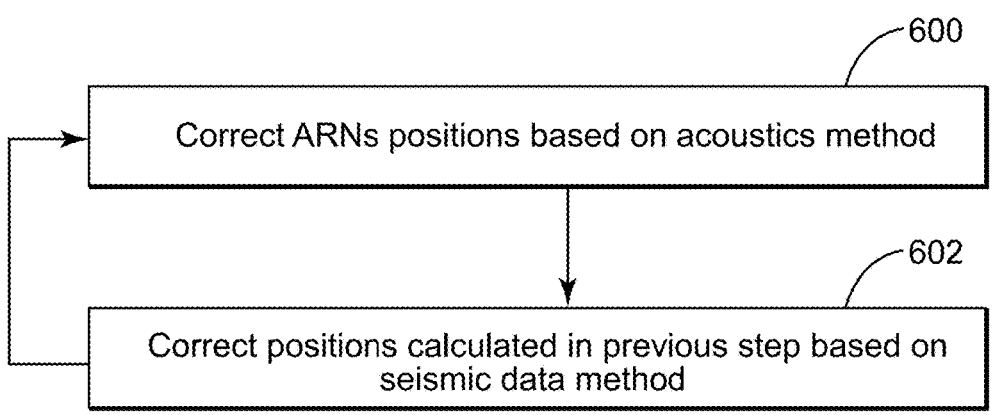
FIG. 6 is a flowchart of a method that uses two different methods for correcting the positions of the ARNs.

As previously discussed, the method illustrated in FIG. 5 (called herein the seismic data method) may be run by itself or it may be combined with the method illustrated in FIG. 2 (called herein acoustics method). In one application, as illustrated in FIG. 6, in step 600, the acoustics method is run to correct the measured positions of the ARNs. Then, in step 602, irrespective of the result of the acoustics method, the seismic data method is run on the positions generated by the acoustics method. The seismic data method refines the positions calculated with the acoustics method. Then, the process can return to step 600 to start again. This process may continue for as long as the ARNs are collecting data.

Figure 7:
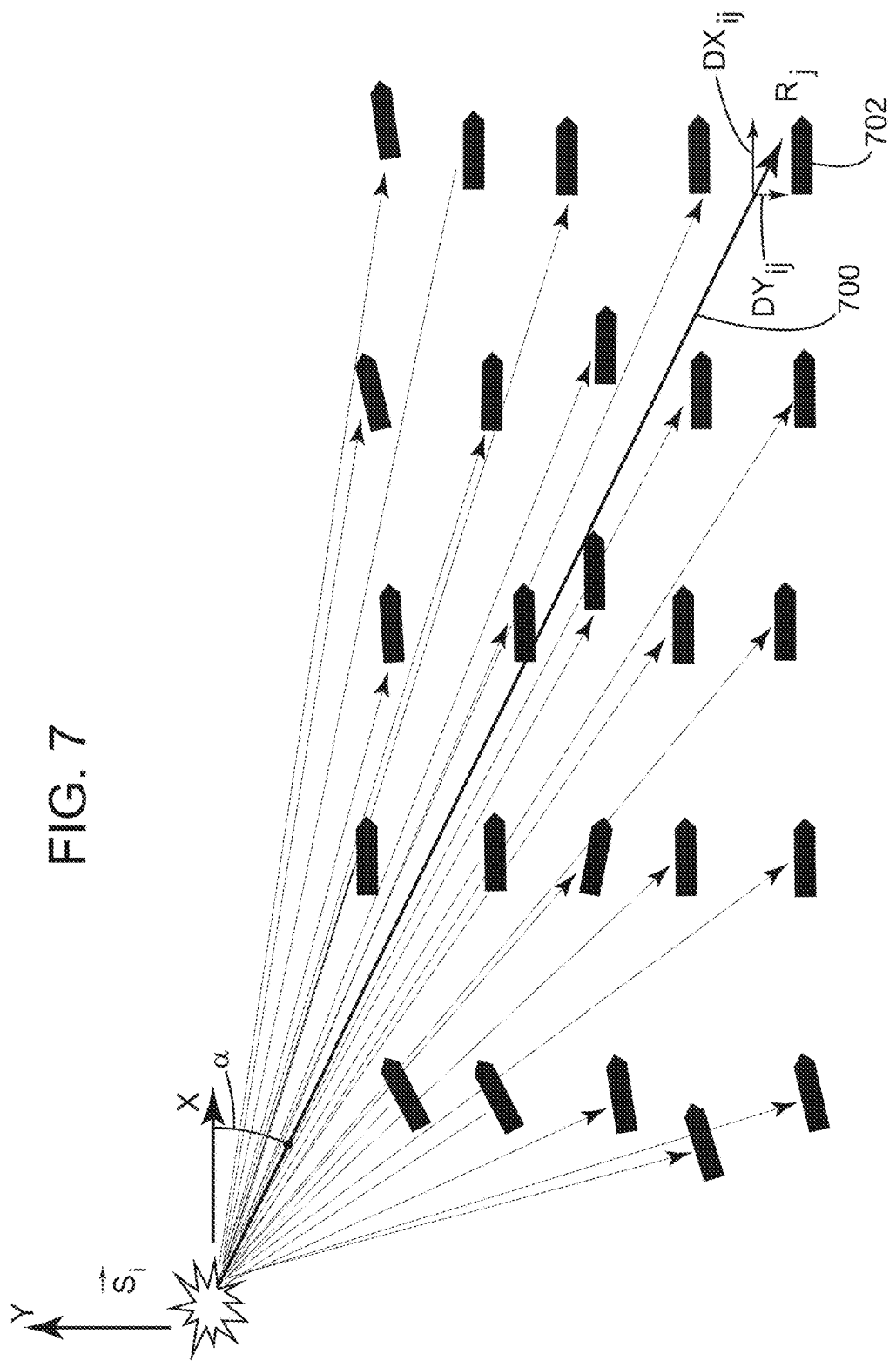
FIG. 7 illustrates the positioning errors of the ARNs.

According to another embodiment, if the offsets between the source and the ARNs are large (i.e., in the order of km, which in the art is called long offset), a long offset approximation method may be implemented for refining the positions of the ARNs. In this embodiment, the azimuth error (the offset has a magnitude but also an angle (azimuth) relative to the inline direction, or travel direction) can be neglected because the source-receiver offsets are much larger than the positioning errors. Under these conditions, only the horizontal error $DRXY_{ij}=[DRX_{ij},DRY_{ij}]$ is present, along the source-receiver azimuth, as illustrated in FIG. 7. FIG. 7 shows the calculated position 700 and the first arrival position 702 and associated horizontal errors. A relation between (i) the two components of the horizontal error and (ii) the horizontal error is given by:

$$DRX_{ij}=\cos \alpha DRXY_{ij} \text{ and}$$

$$DRX_{ij}=\cos \alpha DRXY_{ij}, \qquad (18)$$

where angle $\alpha$ is the azimuth of the source-receiver, which is given by:

$$\tan \alpha = HY_{ij}/HX_{ij}.$$

This approach reduces the number of unknowns and simplifies the decoupling that is present between the lateral positioning errors and depth positioning error.

According to another embodiment, the depth error may be constrained using a primary/ghost system as now discussed. In order to decouple the lateral positioning error $DRXY_{ij}$ from the depth positioning error $DRZ_{ji}$, a misfit associated with a seismic related quantity may be analyzed as discussed next. FIG. 8A shows a source S and an ARN located under the air-water interface 802. Source S emits energy that propagates along various paths. Two paths are shown in FIG. 8A, a path 810 of a water bottom reflection and a path 812 of a ghost signal. The water bottom reflection signal 810 reflects from the water bottom 804 while the ghost signal 812 reflects from the water bottom 804 and the air-water interface 802. The ghost signal 812 could be simulated and compared to the recorded water bottom reflection signal 810. FIG. 8A also shows a depth $Z_R$ of the ARN, a mirror image 820 of the ARN (located symmetrically relative to the air-water interface 802).

FIG. 8B shows a time gap $DT_{gap}$ between the water bottom reflection signal 810 (or primary) and the ghost signal 812 and FIG. 8C shows the frequency spectrum of the seismic data (primary and ghost) recorded by the seismic receivers associated with the ARN. FIG. 8C shows a notch in the frequency spectrum, at $F_{notch}$, which corresponds to the ghost.

Two observations may be made with regard to FIGS. 8B and 8C:

$$DT_{gap}=T_{ghost}-T_{primary}, \text{ and}$$

$$F_{notch}=1/DT_{gap} \qquad (19)$$

The ghost recording time $T_{ghost}$ and the primary recording time $T_{primary}$ can be calculated based on the position of source Si, position of receiver $R_j$ and the depth of water bottom, by assuming a constant homogeneous media in which the speed of sound in water is constant. This means that $F_{notch}$ can also be calculated.

A joint inversion scheme may be applied to the misfit of the direct arrivals (see equation (17)) and the misfit of the ghost of water bottom reflection (see equation (19) so that the positioning error $DR_{ij}$ can be calculated by minimizing the following equations:

$$Tobs_{ij} - Tcal_{ij}(R_{ij} + DR_{ij}) \approx 0, \qquad (20)$$

$$DT_{gap_{obs_{ij}}} - DT_{gap_{cal_{ij}}}(R_{ij} + DR_{ij}) \approx 0, \text{ and}$$

$$F_{notch\_obs_{ij}} - F_{notch_{cal_{ij}}}(R_{ij} + DR_{ij}) \approx 0,$$

where $F_{notch\_obs}$ is obtained from the amplitude spectra of seismic data (see FIG. 8C) and $F_{notch\_cal}$ is calculated based on equation (19), $DTgap_{obs}$ is estimated from the recorded seismic data (see FIG. 8B) and $DTgap_{cal}$ is calculated based on the geometry illustrated in FIG. 8A. Note that the term $(R_{ij}+DR_{ij})$ in the above equations indicates that a respective function $$\left(Tcal_{ij}, \text{ or } DT_{gap_{cal_{ij}}} \text{ or } F_{notch_{cal_{ij}}}\right)$$

is calculated at position $R_{ij}+DR_{ij}$.

In one embodiment, if near offsets or deep water depth (quasi vertical water bottom reflection) data are available, the depth error may be separately corrected by considering the misfit of the ghost to the depth error $DRZ_{ji}$ as follows:

$$DT_{gap_{cal_j}}(R_j + DR_j) = \frac{2(Z_j + DRZ_j)}{V_{water}} \qquad (21)$$

$$Fnotch_{cal_{ij}}(R_{ij}+DR_{ij}) = \frac{V_{water}}{2(Z_j + DRZ_j)}.$$

In another embodiment, the lateral positioning error of the ARN may be constrained using source redundancy. A direct arrival time relating to a source excitation S1 and a given ARN indicates the offset distance H1 between the source and receiver of the ARN. If the source position is known accurately, the source-receiver distance may restrict the receiver's position to be on a circle 900, centered on the source S1 as shown in FIG. 9A. Next, if it is assumed that the receiver's position may be approximately constant for a short period of time, during which the same source or a different source may be excited at a second position S2, as illustrated in FIG. 9B, then a second direct arrival time may be used to calculate a second source-receiver distance H2, which may restrict the receiver's position to one of two locations 910 and 912.

Figure 9C:
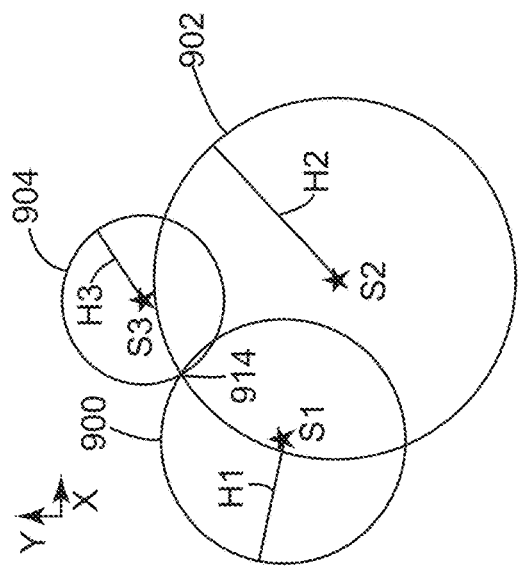
FIGS. 9A to 9C illustrate how to refine the position of one ARN by using multiple sources.
Figure 9B:
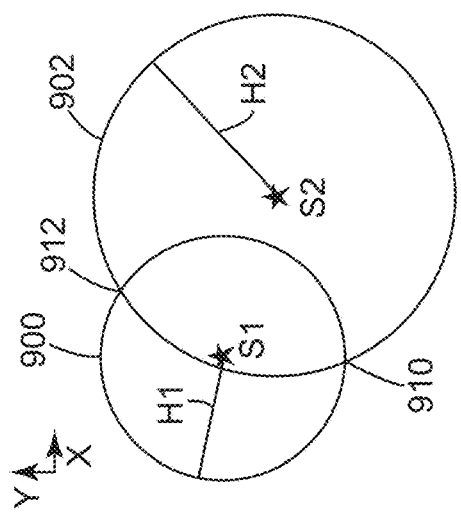
Figure 9A:
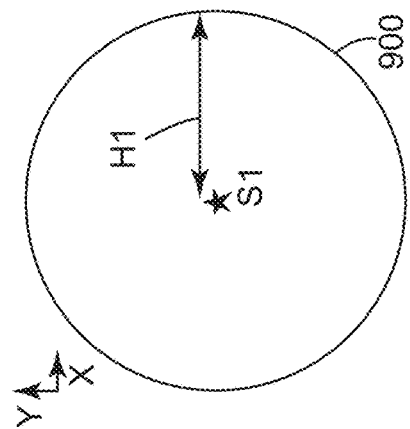

Assuming that the receiver's position has not changed until the excitation of a source (same source or a different one) at a third position S3, a third direct arrival time may be used to calculate a third source-receiver offset H3, which in combination with the offsets generated by positions S1 and S2, may fully define the position 914 of the ARN, as illustrated in FIG. 9C. The source or sources discussed in this embodiment may relate to seismic sources primarily configured to generate reflections from the subsurface for oil exploration. Alternatively, acoustic sources may be configured primarily for positioning and their direct propagation through the water to the ARNs could be recorded by the receivers.

In one embodiment, extra sources (called herein positional sources) may be used to improve the repositioning methods discussed above. In this embodiment, the extra sources, for example, suspended from buoys, may be used to emit high frequency pulses (e.g., sonar) with the same or different bandwidths as each other. In case each source occupies a different bandwidth, the energy from each source may be separated due to frequency based orthogonality, for example, using bandpass filters. Alternatively, the sources may output different codes, e.g., Gold codes or based on Golomb numbers, so the energy from each source may be separated. The frequency range of these positional sources may be within the bandwidth of a main seismic exploration source, or at a frequency different from the main seismic source bandwidth. The buoys may have GPS positioning, the GPS also providing an accurate timing of when the pulses were fired.

Figure 10:
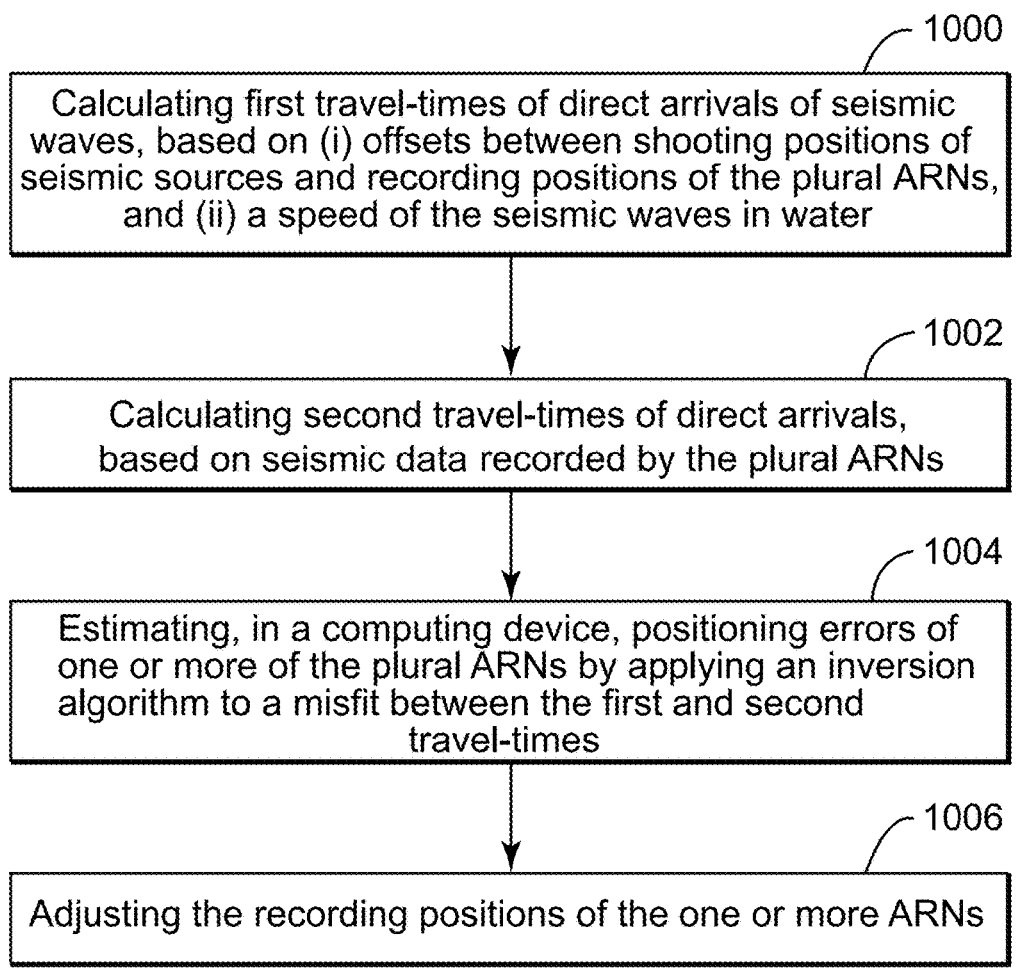
FIG. 10 is a flowchart of a method for correcting positions of plural ARNs based on acoustic data.

According to an embodiment illustrated in FIG. 10, there is a method for adjusting positions of plural ARNs of a seismic survey system. The method includes a step 1000 of calculating first travel-times of direct arrivals of seismic waves, based on (i) offsets between shooting positions of seismic sources and recording positions of the plural ARNs, and (ii) a speed of the seismic waves in water; a step 1002 of calculating second travel-times of direct arrivals, based on seismic data recorded by the plural ARNs; a step 1004 of estimating, in a computing device, positioning errors of one or more of the plural ARNs by applying an inversion algorithm to a misfit between the first and second travel-times; and a step 1006 of adjusting the recording positions of the one or more ARNs.

Figure 11:
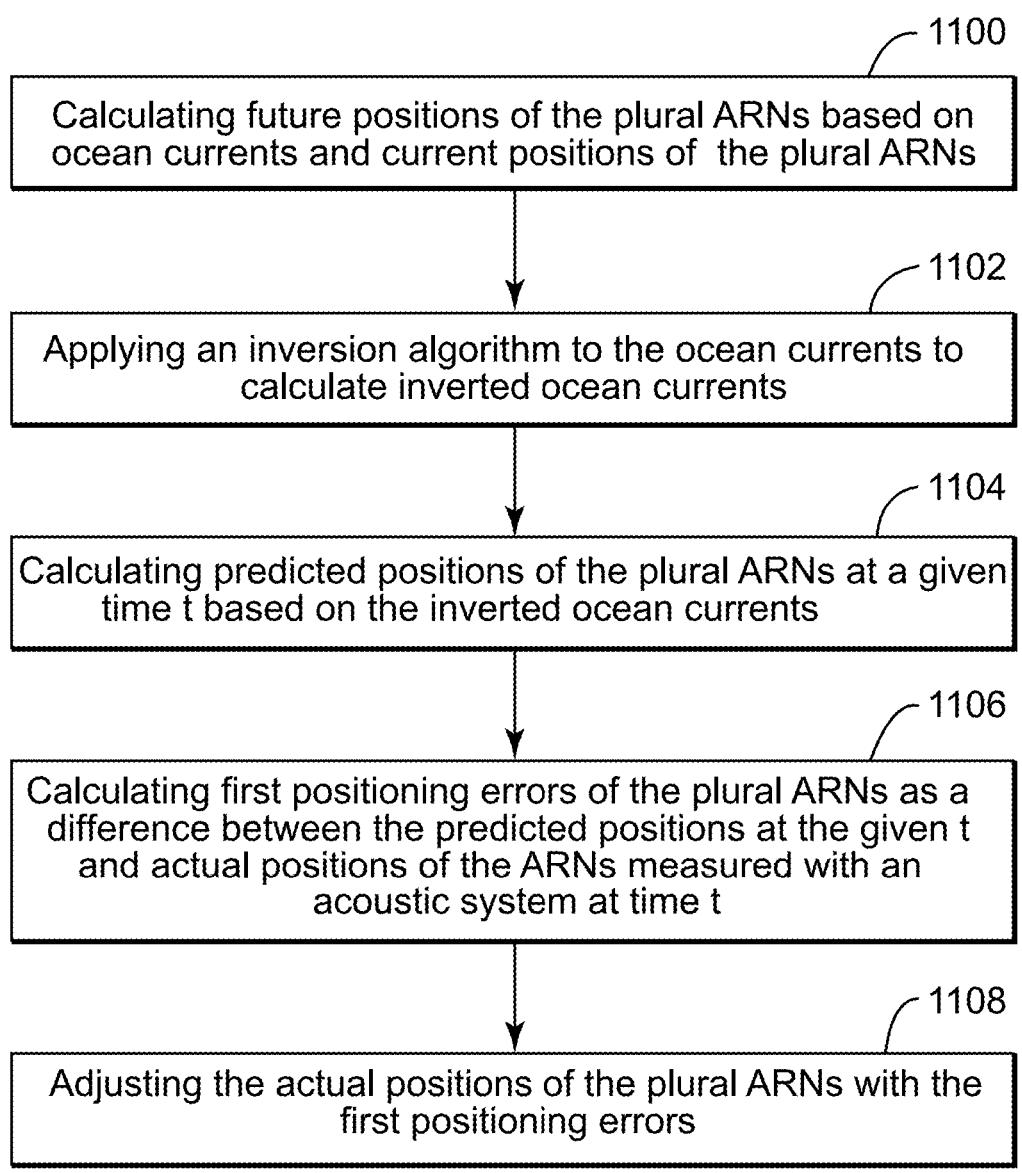
FIG. 11 is a flowchart of a method for correcting positions of plural ARNs based on seismic data.

According to another embodiment illustrated in FIG. 11, there is a method for adjusting positions of plural ARNs of a seismic survey system. The method includes a step 1100 of calculating, in a computing device, future positions of the plural ARNs based on ocean currents and current positions of the plural ARNs, a step 1102 of applying, in the computing device, an inversion algorithm for the ocean currents to calculate inverted ocean currents, a step 1104 of calculating predicted positions of the plural ARNs at a given time t based on the inverted ocean currents, a step 1106 of calculating first positioning errors of the plural ARNs as a difference between the predicted positions at the given t and actual positions of the ARNs measured with an acoustic system at time t, and a step 1108 adjusting the actual positions of the plural ARNs with the first positioning errors.

Various characteristics of the systems presented above are now discussed. The ARNs reside within the water column. The ARNs are communicatively coupled to one or more receivers. The ARNs may be in communication with each other and/or a central communication unit to coordinate positioning and/or transfer of data. The ARN may be one or more of the following:
AUV,
UMV,
ROV (Remotely operated vehicle),
AOV (Autonomously operated vehicle),
Submarine,
Boat,
Surface buoy, or
Wave-glider.

Each ARN includes at least a receiver. The receivers may include one or more of the following sensor types:
Hydrophones,
Accelerometers,
Differential hydrophones,
Particle velocity sensors, and/or
Particle motion sensors.

Several receivers may be mounted on one ARN and may be used independently or in combination, for example, to estimate directional particle motion.

The ARNs may or may not have their own propulsion, which may or may not contaminate seismic data recordings with noise when operational. However, the ARNs will also drift with the current, which may be in the order of 0 to 1 m/s in low current environments or higher. Currents may vary, for example, with season or close to river systems. There may be limited control of the ARN positions during recording. ARNs depths may be constant or may vary with time. In addition, ARNs may all be at the same depth or may be at a range of depths.

The receivers associated with the ARNs may record signals originating from any type of seismic source. A seismic source may include one or more of the following elements:
Airguns,
Marine vibrators,
Mini-sosie,
Vapourchoc,
Waterchoc,
Sparker,
Clapper,
Boomer,
Land vibrator,
Land dynamite, and
Weight drop.

A mixture of different source types may be used. In the case that a source consists of a number of source elements, the elements may be activated synchronously or in a de-synchronised way. This may generate either impulsive or non-impulsive signals. A mixture of impulsive and non-impulsive signals may be mixed. Non-impulsive signals may be of interest in areas sensitive to marine mammals, for example, during breeding seasons. The sources may be positioned together or spread out, for example, to form a beam-like emission. The source or sources may be operated within the Earth response time (the time for all recorded subsurface reflection of interest to be detected), which may give rise to an interference of energy between different sources. This may be due to more than one source operating within the same survey (e.g., cross-talk noise) or in more than one survey (e.g., interference noise).

Source and/or ARN positions may be defined in a number of ways, for example:
Common mid-point (cmp),
Common conversion point (ccp), Asymptotic conversion point (acp),
Shot gather,
Receiver gather,
Surface consistent shot gather,
Surface consistent receiver gather, and
Common image point, i.e., coverage in a migrated domain.

Source positions may be controlled by steering of a vessel with or without additional source steering, for example, on a pulley system. Source positions may be operated:

Independently of the position of the ARNs, for example on pre-plot positions, or
Based on existing coverage: This may relate to a previous acquisition and may involve one or more of the following:
Navigation information prior to the day of acquisition, or
Navigation information on the day of acquisition.

Positioning may be:
Transmitted while the ARNs are in the water column,
Transferred after collection of the ARNs, or
A combination of transfer while in the water column and after collection.

Coverage of receivers may be important for processing, and for this reason spatially consistent bins (for example shot, receiver, acp, ccp, cmp, etc) bins may be defined.

The coverage of a receiver bin may relate to shots fired once a receiver was positioned within the bin. The receiver bin may have a spatial extent within which the Earth response may be considered to be constant. The size of the bin will depend on the geological complexity, velocity of sound in the subsurface, and the target of interest. The dimensions of the bin may range from 5 $m^2$ to 100 $m^2$. Data relating to shots firing while the receiver is in the bin may be collected and processed as a group of traces known as a spatially consistent receiver gather. The data may be processed in a number of ways, for example:

Denoise, which may be random or coherent, including:
cross-talk,
interference noise,
propulsion noise,
random noise,
multiples,
swell noise,
wavefield separation, e.g., separating up-going from down-going energy (either on source or receiver side),
Airgun bubble attenuation, or
Attenuation of non-isotropic source signature effects
Re-positioning
f source and/or receiver in any combination of an x-direction, y-direction, or z-direction.
may include data regularization, data interpolation, and data extrapolation.
Migration; any form of migration to a sub-surface positioning. This may include time or depth migration, for example, Kirchhoff, Beam, Wave equation (one way or RTM).
Other processing, for example:
Tidal correction,
Wave-height correction on source and/or receiver side, or
correction for variation in the velocity of sound in the water column.

The ARNs may be sampled with fixed or varying separation (e.g., 1 m, 10 m, 25 m, 50 m, 100 m, 150 m, 200 m, 250 m, 300 m, 400 m, 500 m, or larger) in a number of different configurations, some of which are listed below:
In a line,
Triangular grid,
Square grid, and
Hexagonal grid.

In addition, the ARNs may be programmed to operate at one or more different depths. This may be of use to generate a source or receiver ghost notch diversity of data or to help attenuate multiples. For example, this may relate to varying sets of the above configurations at different depths.

It may be possible that the receivers are not sufficiently well sampled, and for this reason, it may be necessary to interpolate receiver and/or shot positions in any one of the three spatial coordinates (x,y,z) during seismic data acquisition and/or processing to produce an adequate sampling. Data interpolation may or may not involve collecting data into gathers, for example any of the positions mentioned earlier.

The interpolation may involve application of convolutional filters and/or transformation of the data to a model domain. This process may involve linear and/or non-linear inversion. The inversion may iteratively represent the input data, for example, with conjugate gradients inversion or another iterative representation of the input data (e.g., matching pursuit by deriving model parameters in groups or one by one). The inversion may or may not involve use of model and/or data domain sparseness weights. The sparseness weights may be derived on low frequencies to avoid aliasing of high frequency data.

Some examples of model domains may be:
Frequency wave-number (FK),
Linear,
Parabolic,
Hyperbolic,
Shifted hyperbolic,
SVD,
Rank reduction,
Seislet,
Contourlet,
Curvelet,
Ridgelet, or
Wavelet.

The interpolation may be designed to reconstruct data on a regular or irregular shot and/or receiver sampling at spatial positions (x,y,z) at least some of which are different to the input spatial positions. The filters or model domain may also be used to perform any of the processing steps mentioned earlier.

Shot and/or receiver positions may vary as a function of time. As such, for each shot it is possible to at least partially reconstruct the energy in-between receivers (for example in x, y, or z) to improve sampling, fold, or to form a spatially consistent group of traces (e.g., receiver bin). In one application, it is possible to consider positions to be constant during an Earth response time where all useful subsurface reflections may be recorded. Alternatively, it is possible to consider the positions to vary as a function of recording time, for example, for every sample.

Trace segments recorded when the ARN's propulsion is running may render segments of data unusable, at least in some bandwidths. For this reason, it may be of benefit to design data domain sparseness weights to make a linear operation (for example, filtering and/or model domain derivation) less sensitive to noisy segments of data.

In one embodiment, a source is excited and seismic recordings are made at a plurality of ARNs positioned within a spatial region. The positions of the source excitation and of the ARNs are recorded along with seismic data (as a function of time). An inverse problem is defined to derive a series of plane waves constrained by the recordings at the receivers. The decomposition may be made for a subset of the trace length and/or spatial region.

An equation describing the inverse problem is given for a single frequency slice (i.e., for the data after FFT), but may also be formulated for application in the time domain. The inverse problem may be defined as:

$$d(n)=L(n,m)p(m) \text{ with}$$

$$L(n,m)=e^{-2\pi i f s(m)x(n)}$$

where:
d(n)—Input data vector for n traces,
p(m)—Model of m traces to be found by inversion,
L(n,m)—Linear operator,
s(m)—Slowness of mth model vector (s/m),
x(n)—Position of nth receiver (m), and
f—Frequency (Hz).

Once the model p has been found for a given frequency, it may be used to derive model domain sparseness weights that may be used to constrain an inversion. The weights may be for the same frequency or for a different frequency (e.g., a higher frequency that may be aliased). The sparseness weights may be bootstrapped (e.g., use sparseness weights derived on frequency f to constrain the model for frequency f+1), or may be derived on a range of frequencies (e.g., derive average weights from fa to fb, and use the average weights to constrain an inversion). A constrained inversion problem is described in Trad et al, 2003, "Latest views of the sparse radon transform," Geophysics. Model p may also be used to process the recorded seismic data, e.g., remove noise, reconstruct data at new positions, etc.

According to an embodiment, the model and recorded seismic data (having the recording positions corrected with the positioning errors discussed in the embodiments of FIGS. 2, 5, 10 and 11) may be used to perform:

Surface consistent data reconstruction including:
Deploy an ARN in a water column,
Excite a seismic source a plurality of times,
Receive seismic data as a function of time from the receiver of the ARN relating to a pressure wavefield in the water column,
Receive positional data relating to at least one of the source or the ARN (e.g., in at least one of x-position, y-position, z-position),
Associate the position data with the seismic data,
Correct the position data as discussed in one of the above embodiments,
Use the association to reconstruct seismic data at a spatially consistent location different to those of the input data, and
Generate an image of the subsurface based on the reconstructed seismic data.

In this embodiment, the positional data relates to a source position or to a receiver position. The reconstruction may include deriving a model of the data. The reconstruction may include applying a convolutional filter or an inversion. The inversion is linear or non-linear. The inversion may include data and/or model domain sparseness weights. In one application, the spatially consistent location is at least one of a spatially consistent shot position, receiver position, cmp position, ccp position, acp position. In still another application, the spatially consistent data is used for further processing. The further processing includes denoise and/or data interpolation.

In another embodiment, there is a method for transforming autonomous receiver data into a model domain. The method may include one or more of the following steps:
Deploy an ARN in a water column,
Excite a seismic source a plurality of times,
Receive seismic data as a function of time from the receiver of the ARN relating to a pressure wavefield in the water column,
Receive positional data relating to at least one of the source or the receiver (e.g., in at least one of x-position, y-position, z-position),
Associate the position data with the seismic data,
Correct the position data as discussed in one of the above embodiments,
Use the association to transform the seismic data into a model domain, and
Generate an image of the surveyed subsurface based on the model domain.

In one application, the model domain is in a different domain than the received seismic data. In another application, the model domain is used to attenuate noise in the input data. In still another application, the model domain is used to reconstruct data relating to the pressure wavefield at positions different to the received seismic data.

In one embodiment, an ARN may be an AUV. An AUV is now discussed with regard to FIG. 12, which illustrates an AUV 1200 having a body 1202 in which a propulsion system 1203 may be located. Note that in one embodiment, there is no propulsion system. If the propulsion system 1203 is available, it may include, for example, one or more propellers 1204 and a motor 1206 for activating the propeller 1204. Alternatively, the propulsion system may include adjustable wings for controlling a trajectory of the AUV. The motor 1206 may be controlled by a processor 1208. The processor 1208 may also be connected to a seismic sensor 1210. The seismic sensor 1210 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, the seismic sensor 1210 includes three accelerometers and a hydrophone, i.e., a total of four sensors. Alternatively, the seismic sensor may include three geophones and a hydrophone. Of course, other sensor combinations are possible.

A memory unit 1212 may be connected to the processor 1208 and/or the seismic sensor 1210 for storing seismic data recorded by the seismic sensor 1210. A battery 1214 may be used to power all these components. The battery 1214 may be allowed to shift its position along a track 1216 to change the AUV's center of gravity.

The AUV may also include an inertial navigation system (INS) 1218 configured to guide the AUV to a desired location. An inertial navigation system includes at least a module containing accelerometers, gyroscopes or other motion-sensing devices. The INS is initially provided with the current position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation or velocity once it has been initialized. Further, using an INS is inexpensive.

Besides or instead of the INS 1218, the AUV may include a compass 1220 and other sensors 1222 as, for example, an altimeter for measuring its altitude, a pressure gauge, an interrogator module, etc. The AUV 1200 may optionally include an obstacle avoidance system 1224 and a communication device 1226 (e.g., Wi-Fi or other wireless communication) or other data transfer device capable of wirelessly transferring seismic data. In one embodiment, the transfer of seismic data takes place while the AUV is on the vessel. Also, it is possible that the communication device 1226 is a port wire-connected to the vessel to transfer the seismic data. One or more of these elements may be linked to the processor 1208. The AUV further includes an antenna 1228 (which may be flush with the AUV's body) and a corresponding acoustic system 1230 for communicating with the deploying, recovery or shooting vessel or other vehicle. Stabilizing fins and/or wings 1232 for guiding the AUV to the desired position may be used with the propulsion system 1203 for steering the AUV. However, in one embodiment, the AUV has no fins or wings. The AUV may include a buoyancy system 1234 for controlling the AUV's depth as will be discussed later.

Figure 12:
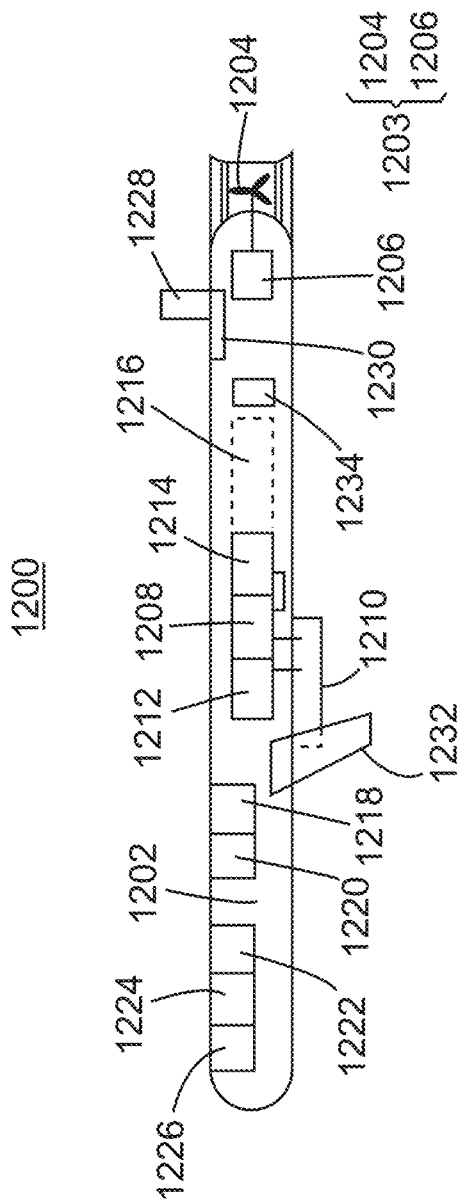
FIG. 12 is a schematic diagram of an AUV.

The acoustic system 1230, which may be also present on the mother vessel for determining the ARN's position, may be an Ultra-Short Baseline (USBL) system, also sometimes known as Super Short Base Line (SSBL), which uses a method of underwater acoustic positioning. A complete USBL system includes a transceiver mounted on a pole under the mother vessel, and a transponder/responder on the AUV. It also may include a depth sensor (not shown) and/or a heading sensor (not shown) for reducing the ambiguity generated by the acoustic system 1230. A processor is used to calculate the AUV's position from the ranges and bearings the transceiver measures and also the depth or/and heading information. The processor may be located on the AUV or the mother vessel. For example, the transceiver transmits an acoustic pulse that is detected by the subsea transponder, which replies with its own acoustic pulse. This return pulse is detected by the transceiver on the vessel. The time from transmission of the initial acoustic pulse until the reply is detected is measured by the USBL system and converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less. The AUV 1200 illustrated in FIG. 12 is exemplary. Other AUVs may be used as the ARN.

Figure 13:
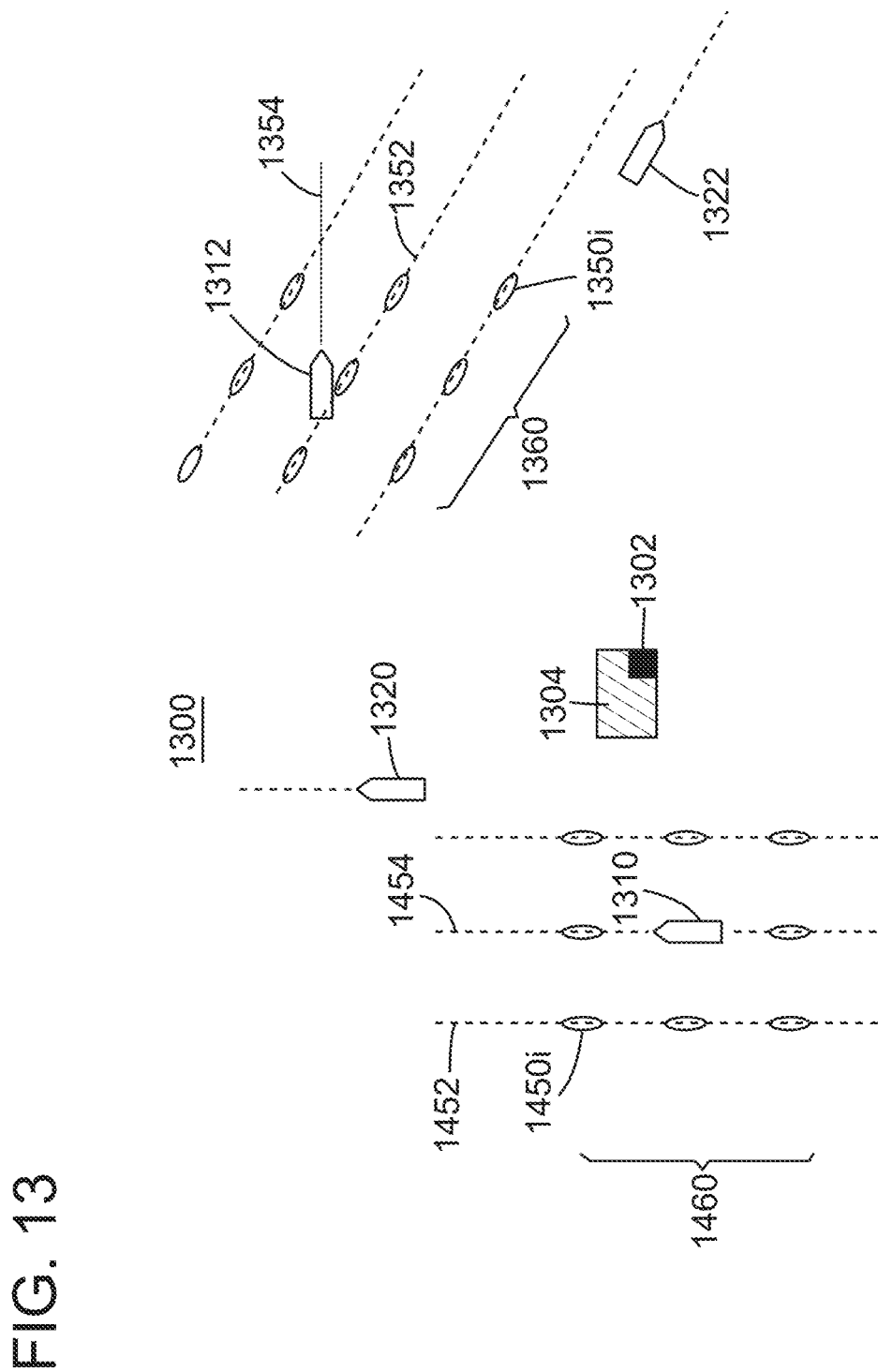
FIG. 13 is a schematic diagram of a seismic survey system including plural clusters of AUVs.
Figure 14:
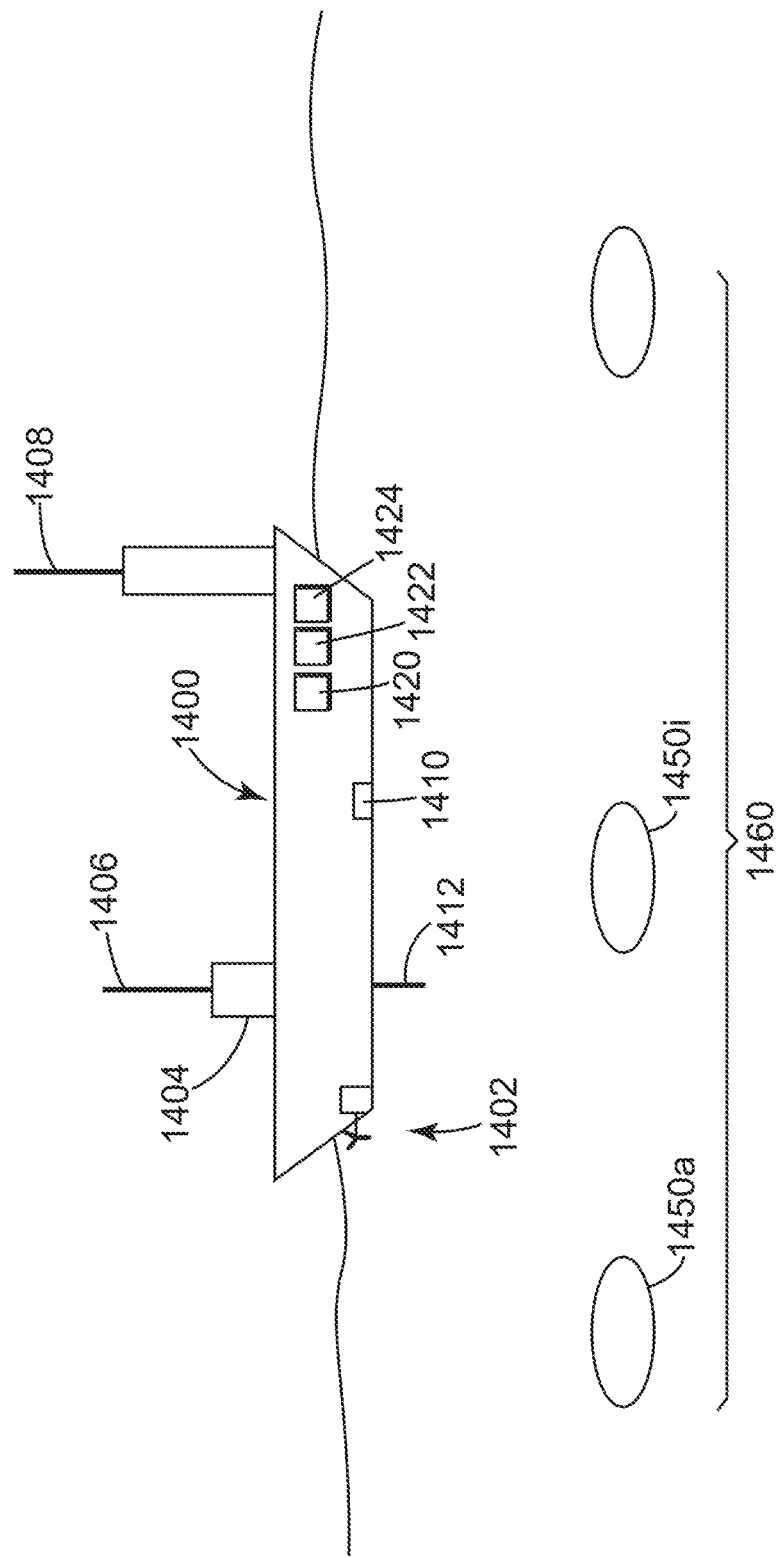
FIG. 14 is a schematic view of a cluster and corresponding unmanned surface vessel according to an exemplary embodiment.

The plural ARNs discussed in the previous embodiments may be controlled as a single swarm by a single mother vessel or as plural swarms as now discussed. As illustrated in FIG. 13, a seismic survey system 1300 may include a central control unit 1302 located on, for example, an oil rig or mother vessel 1304. The central control unit 1302 is in radio communication with one or more unmanned surface vehicles (USVs) 1310 and 1312. More than two USVs may be used. A USV, as illustrated in FIG. 14, may be a boat 1400 (e.g., small size boat) having a propulsion system 1402 and an intermediate control unit 1404 that is in radio communication with the central control unit 1302. Boat 1400 may have an antenna 1406 for communicating with the mother vessel 1304, and a GPS system 1408 for obtaining accurate position information. The USV 1400 may also include an acoustic modem 1410 for communicating with AUVs 1450i, and/or an acoustic underwater positioning and navigation (AUPN) system 1412 for detecting the location of the AUVs 1450i. Thus, USV 1400 is capable of locating each AUV 1450i in a cluster 1460 of AUVs. USV 1400 may also include a processor 1420, a storage device 1422 for storing information (e.g., seismic data, location information, quality control data, etc.), and a battery 1424 or another power source. In one application, USV 1400 is a small boat with no personnel on board that is remotely controlled by the central control unit 1302.

Returning to FIG. 13, note that each USV 1310 and 1312 has its own cluster (swarm, set, or array) 1460 or 1360 of ARNs. In an exemplary embodiment, a cluster of ARNs (e.g. AUVs) may include from a few ARNs to tens of ARNs. Also note that ARN patterns in each cluster may be different. For example, cluster 1460 has a row and column arrangement in which all ARNs follow lines 1452 parallel to the traveling direction 1454 of USV 1310, while in cluster 1360, AUVs 1350i are grouped along parallel lines 1352 that form an angle different than zero with a traveling direction 1354 of USV 1312. Other ARNs patterns may be imagined and implemented. Further, the number of ARNs in each cluster may differ.

One or more source vessels 1320 and 1322 may be used to generate the acoustic waves. In one exemplary embodiment, each ARN cluster has its own source vessel. In another exemplary embodiment, the same source vessel may be shared by multiple clusters. However, in still another exemplary embodiment, plural source vessels may be assigned to a single cluster.

Communication between the central and intermediate control units is radio-based, while communication between the intermediate control units and the ARNs is acoustic-based. Other known and appropriate means for communication may be used. With such a configuration, the management of ARNs is improved because each USV interacts with a limited number of ARNs (not thousands), and the maneuverability of an ARN cluster is improved because such a small number of ARNs can easily move around any obstacle, e.g., the oil rig. Seismic survey cost is also reduced comparative to traditional AUV-based surveys because smaller boats are used and the number of persons necessary to control the survey is limited (it is expected that two to three persons are needed on the oil rig to supervise the entire seismic survey, as opposed to tens, if not hundreds, of persons needed for a traditional boat with streamers).

Those skilled in the art know that when recording the seismic data, the ARNs need to know their location so that each recorded trace is associated with a correct position. Because the ARNs are designed to move underwater, e.g., between depths of 300 and 3,000 m, the use of GPS systems on the ARNs is not possible because electromagnetic waves do not travel so far in water. However, this embodiment uses the GPS on the USV to determine the exact location of each USV, and then the USV uses its AUPN to determine the position of each ARN in its cluster. This position is then transmitted, in one embodiment, to the ARNs using, for example, the acoustic modem. Thus, in this embodiment, each ARN in the cluster receives its location at given time intervals, as appropriate for accurately associating the recorded traces with their positions. Alternatively or in addition, the measured position of each ARN is transmitted to the mother vessel for performing the calculations noted in the embodiments discussed with regard to FIGS. 2, 3, 10 and 11 and only then these positions are transmitted to the ARNs.

Communication between the ARN and the USV vessel may take place based on various technologies, i.e., acoustic waves, electromagnetic waves, etc. According to an exemplary embodiment, an acoustic underwater positioning and navigation (AUPN) system may be used. The AUPN system may be installed on the USV and may communicate with the AUV's acoustic system 1230.

The AUPN system may exhibit high accuracy and long-range performance in both positioning and telemetry modes. These features are obtained due to the automatic beam forming transducers, which focuses the sensitivity toward its targets or transponders. This beam can not only be pointed in any direction below the vessel, but also horizontally and even upward to the surface because the transducer is spherical.

Thus, the AUPN may be a hydro-acoustic Super Short Base Line—SSBL or USBL tow-tracking system, able to operate in shallow and deepwater areas to proven ranges in excess of 3,000 meters. It is a multi-purpose system used for a wide range of applications, including towfish and towed platform tracking, high-accuracy subsea positioning and telemetry and scientific research.

The AUPN is used to determine the ARN's position. In one embodiment, the ARN's actual position is measured with the AUPN and then provided to the ARN and/or the mother vessel. The ARN may have an USBL sensor array configured to work with the USV's USBL system.

Figure 15:
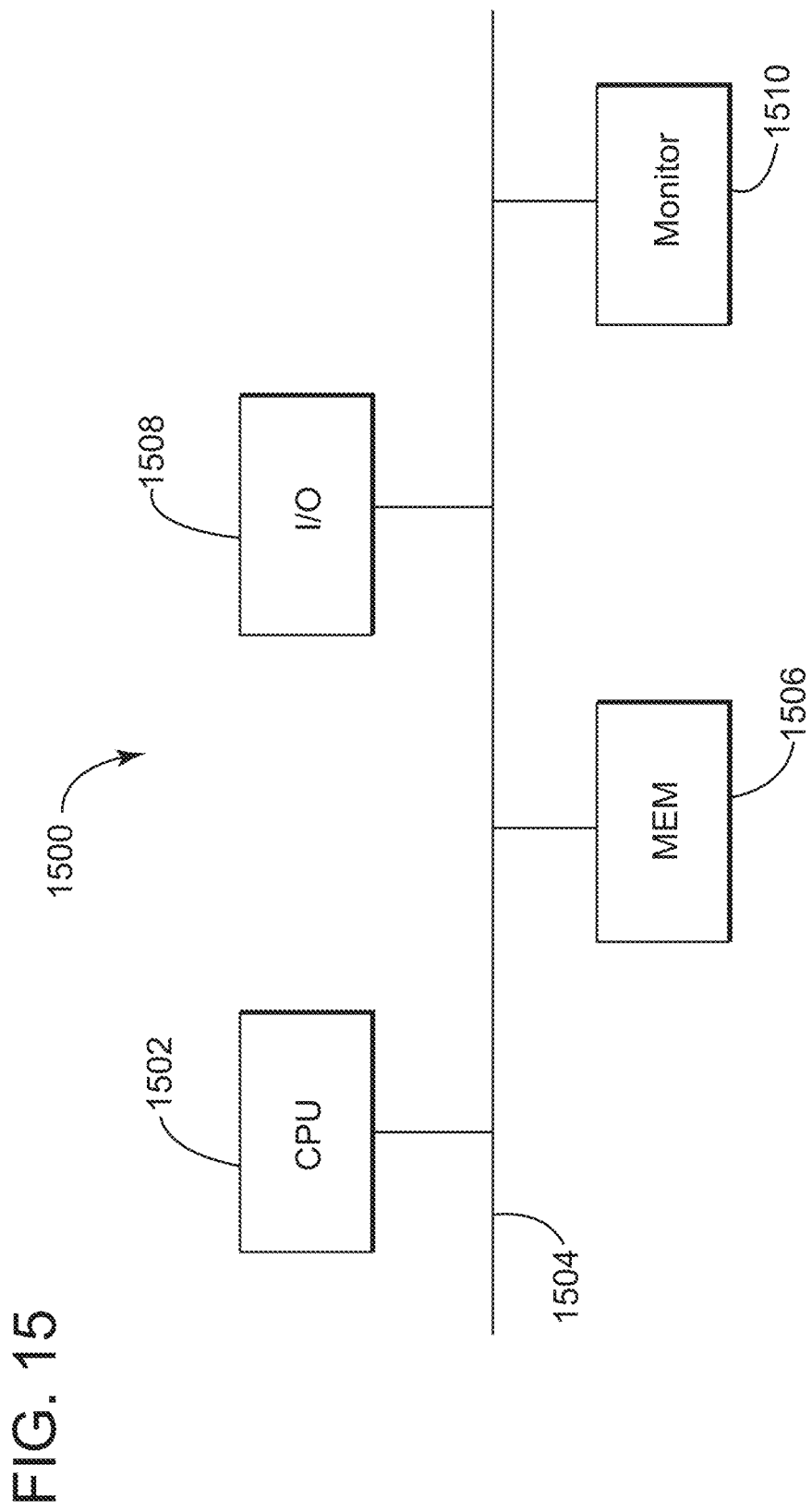
FIG. 15 is a schematic diagram of a computing device that performs one or more of the methods noted above.

A computing device that may implement one or more of the methods discussed above are now discussed with regard to FIG. 15. Computing device 1500 includes a processor 1502 that is connected through a bus 1504 to a storage device 1506. Computing device 1500 may also include an input/output interface 1508 through which data can be exchanged with the processor and/or storage device. For example, a keyboard, mouse or other device may be connected to the input/output interface 1508 to send commands to the processor and/or to collect data stored in storage device or to provide data necessary to the processor. In one application, the processor calculates the distance d based on the time length of the actual record and the speed of light, which information may be provided through the input/output interface. Also, the processor may be used to process, for example, seismic data collected during the seismic survey. Results of this or another algorithm may be visualized on a screen 1510.

One or more of the embodiments discussed above disclose using one or more ARNs for performing seismic recordings. It should be understood that this description is not intended to limit the invention. On the contrary, the embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for monitoring and adjusting recording positions of plural autonomous receiver nodes (ARNs) of a seismic survey system exploring a subsurface under seafloor, the method comprising:
    calculating first travel-times of direct arrivals of seismic waves, based on (i) offsets between shooting positions of seismic sources emitting the seismic waves and estimated recording positions of the plural ARNs, and (ii) a speed of the seismic waves in water;
    estimating second travel-times of the direct arrivals, based on seismic data recorded by the plural ARNs that detect the seismic waves including ones traveling through the subsurface;
    estimating, in a computing device, positioning errors of one or more among the plural ARNs by applying an inversion algorithm to a misfit between the first and second travel-times; and
    adjusting the estimated recording positions of the one or more ARNs with the positioning errors to obtain updated recording positions used when processing the seismic data.

2. The method of claim 1, further comprising:
    identifying the one or more ARNs among the plural ARNs for which a respective misfit exceeds a given threshold.

3. The method of claim 1, wherein a positioning error of one of the ARNs is equal to a difference of first and second travel-times of the one of the ARNs multiplied by the speed of the seismic waves in water.

4. The method of claim 1, wherein the estimated recording positions are based on measurements performed with an acoustic system.

5. The method of claim 1, further comprising:
    recalculating the first travel-times based on the (i) updated offsets between the shooting positions of the seismic sources and the updated recording positions of the plural ARNs, and (ii) the speed of the seismic waves in water.

6. The method of claim 1, wherein the inversion algorithm operates on individual ARN recordings.

7. The method of claim 1, wherein the inversion algorithm operates jointly on all individual ARN recordings.

8. The method of claim 1, wherein the estimated recording positions of the plural ARNs are calculated based on ocean currents and initial recording positions measured with an acoustic system.

9. The method of claim 1, further comprising:
    generating a mask of weights for the estimated recording positions of the plural ARNs, based on the positioning errors.

10. The method of claim 9, further comprising:
    calculating weighted positioning errors by applying the mask of weights to the estimated recording positions.

11. A computing device for monitoring and adjusting recording positions of plural autonomous receiver nodes (ARNs) of a seismic survey system, the computing device comprising:
    an interface for receiving offsets between shooting positions of seismic sources and estimated recording positions of the plural ARNs; and
    a processor connected to the interface and configured to,
    calculate first travel-times of direct arrivals of seismic waves, based on (i) the offsets between shooting positions of seismic sources and the estimated recording positions of the plural ARNs, and (ii) a speed of the seismic waves in water,
estimate second travel-times of the direct arrivals, based on seismic data recorded by the plural ARNs,
estimate, in a computing device, positioning errors of one or more among the plural ARNs by applying an inversion algorithm to a misfit between the first and second travel-times of the one or more among the plural ARNs, and
adjust the estimated recording positions of the one or more ARNs with the positioning errors to obtain updated recording positions used when processing the seismic data.

12. The device of claim 11, wherein the processor is further configured to:
identify the one or more ARNs among the plural ARNs for which a respective misfit exceeds a given threshold.

13. The device of claim 11, wherein a positioning error of one of the ARNs is equal to a difference of respective first and second travel-times of the one of the ARNs multiplied by the speed of the seismic waves in water and the estimated recording positions are based on measurements with an acoustic system.

14. The device of claim 11, wherein the processor is further configured to:
recalculate the first travel-times based on (i) updated offsets between the shooting positions of the seismic sources and the updated recording positions of the plural ARNs, and (ii) the speed of the seismic waves in water.

15. A method for adjusting trajectories of plural autonomous receiver nodes (ARNs) of a seismic survey system, the method comprising:
calculating, in a computing device, estimated positions of the plural ARNs at time t based on ocean currents and current positions of the plural ARNs;
applying, in the computing device, an inversion algorithm to the ocean currents to calculate inverted ocean currents;
calculating predicted positions of the plural ARNs at a given time t based on the inverted ocean currents;
calculating first positioning errors of the plural ARNs as a difference between the predicted positions at the given t and distances to actual positions of the ARNs measured with an acoustic system at time t; and
adjusting the actual positions of the plural ARNs with the first positioning errors.

16. The method of claim 15, further comprising:
generating a mask of weights for the current positions of the plural ARNs, based on the first positioning errors.

17. The method of claim 15, further comprising:
calculating first travel-times of direct arrivals of seismic waves, based on (i) offsets between shooting positions of the seismic sources emitting the seismic waves and estimated recording positions of the plural ARNs, and (ii) a speed of the seismic waves in water;
calculating second travel-times of the direct arrivals, based on seismic data recorded by the plural ARNs that detect the seismic waves including ones traveling through the subsurface;
estimating second positioning errors of one or more among the plural ARNs by applying another inversion algorithm to a misfit between the first and second travel-times; and
adjusting the estimated recording positions of the one or more ARNs with the second positioning errors.

* * * * *